UNITED STATES PATENT OFFICE.

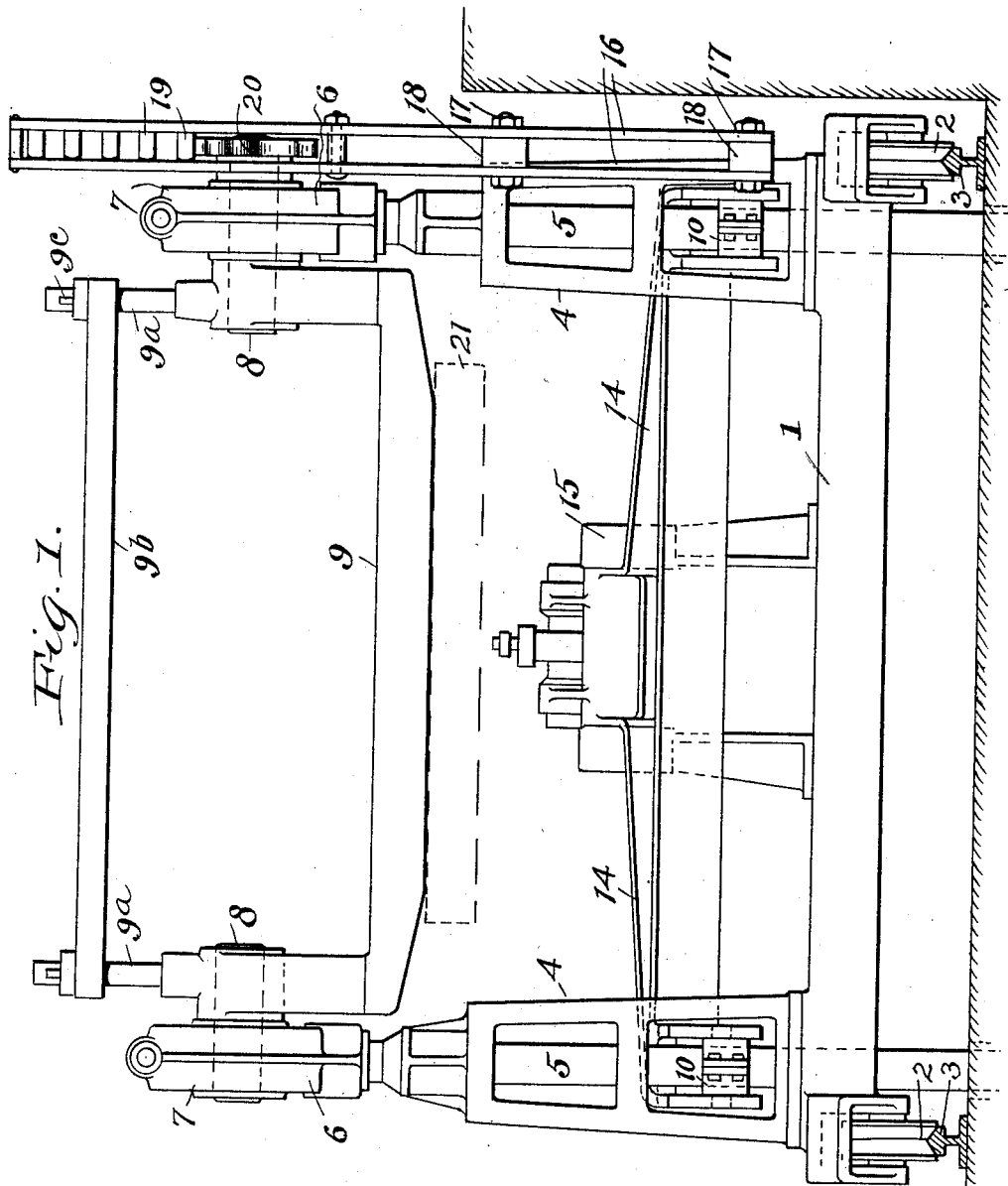

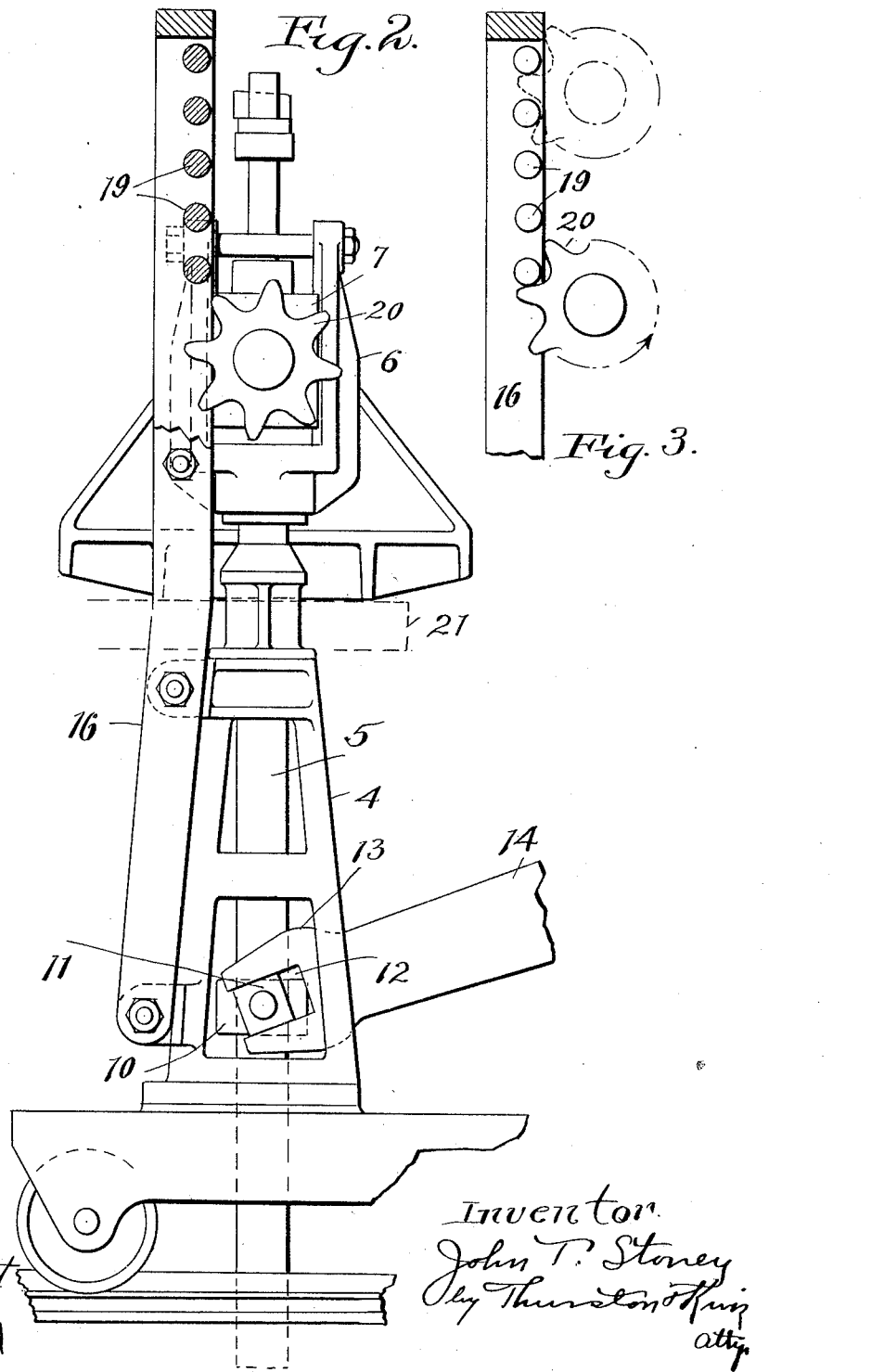

JOHN T. STONEY, OF CLEVELAND, OHIO.

MOLDING-MACHINE.

1,113,709.  Specification of Letters Patent.  Patented Oct. 13, 1914.

Application filed February 11, 1914. Serial No. 818,019.

*To all whom it may concern:*

Be it known that I, JOHN T. STONEY, a citizen of the United States, residing at Cleveland, in the county of Cuyahoga and State of Ohio, have invented a certain new and useful Improvement in Molding-Machines, of which the following is a full, clear, and exact description.

This invention relates to molding machines of the type wherein the molding table is rolled over for the purpose of drawing the pattern from the mold.

More particularly, the invention relates to mechanism whereby the table is caused to roll over as the table is raised.

Generally speaking, the invention comprises the elements and combinations thereof set forth in the accompanying claims.

Reference should be had to the accompanying drawings forming a part of this specification, in which—

Figure 1 is a front elevation of a molding machine embodying my invention. Fig. 2 is a side elevation of a portion of the machine embodying my invention; and Fig. 3 is a detail illustrating different positions of the mechanism for turning over the table.

In large molding machines of the roll over type, that is to say, machines in which the molding table is rolled over with the mold, after the same has been completed for the purpose of drawing the mold from the pattern, it is customary to roll over this table by hand, and of course this is not a difficult operation when the machine is small and the weight of the table and mold is not considerable. However, in larger machines it will be appreciated that the mold and the table will weigh a great deal, and so make the rolling over of the table a very difficult operation.

In this application I have shown a machine in which the table will be rolled over by mechanism which operates in connection with the mechanism for raising the molding table, and which will cause the turning over of the molding table simultaneously with the raising thereof.

In Fig. 1, I have shown a form of molding machine with my roll over mechanism attached thereto, and I wish it understood that the particular construction of the machine which is here shown forms no limitation upon the application of my invention, as it is applicable to any type of molding machine wherein the molding table is raised and is adapted to be rolled over.

At 1 there is shown a support or platform, which is provided with wheels 2, there being a plurality of wheels at least one wheel at each corner. These wheels will be mounted in suitable bearings which will need no description. The wheels are adapted to coöperate with tracks 3, that the supporting platform may be moved along the same.

In machines of this type it is usual to mount the mechanism below the level of the floor upon which the workmen stand, and to make the pit in which the machine is located sufficiently deep so that the molding table is but a short distance above the operating floor, as otherwise it would be necessary to provide a platform upon which the operators of the machine might stand.

In the particular machine shown in Fig. 1, the pit in which the machine is located is of sufficient length so as to permit a movement of the supporting platform 1 along the tracks with which the wheels engage. Upon the platform 1 are uprights 4, which are located at opposite sides thereof. These uprights guide and house the vertical operating rods 5. These rods at their upper ends support heads 6, in which is carried, as shown in Fig. 2, slidable blocks 7. These blocks normally rest in contact with the heads 6, so that as the rods 5 are raised the blocks 7 will be carried upward.

In the blocks 7 there are trunnions 8, which pivotally support the roll over molding table 9. This table, as will be seen from Fig. 1, comprises a table portion, which is provided with arms at the end thereof, which arms are secured to the trunnions. The arms also carry extending rods 9$^a$, and these rods receive a cross bar 9$^b$, the bar 9$^b$ being perforated at its ends to slip over the rods 9$^a$, and the bar is held in any desired manner, and, as shown, I employ wedges 9°, which are adapted to be driven into a slotted portion of the rods 9ª. The bar 9ᵇ is adapted to engage with the upper portion of the flask to hold the same upon the table 9 during the rolling over operation.

Each elevating rod 5 is provided with a collar 10, which is adjustable upon the rod. Each collar is provided with a swiveled rectangular block, such as illustrated at 11. The blocks associated with this collar are adapted to be engaged by recessed portions 12 in a forked head 13, each head being carried by an arm 14 of a lever mechanism, which is pivoted upon upright standards 15, shown in Fig. 1. Operation of this lever mechanism, which may be accomplished in any desired manner, will cause the raising and lowering of the operating rods 5.

Upon one of the upright supports 4 there is secured a rack mechanism, the same consisting of two side portions 16, which are secured to each other at various intervals by means of bolts 17, the sides 16 being spaced apart by sleeves 18, which encircle the bolts before referred to. These side pieces 16 are secured to the supports 4, so as to be very rigid therewith, and it will be readily seen the racks are immovable with respect to the roll over table 9, its trunnions, etc.

Adjacent the upper portion of the side member 6 there are a series of transverse members 19. These members 19 are mounted between the sides 16 at regular intervals, and form rack teeth.

The trunnion 8, which is adjacent to the rack thus described, is extended sufficiently to permit the mounting of a pinion 20 upon the same. This pinion is provided with a number of teeth, and the teeth are suitably formed with respect to the members 19 of the rack, such that as the table 9 is raised, and the teeth of the pinion 20 come into contact with the members 19 of the rack, it will cause a turning of the pinion 20 and a consequent rolling over of the table 9. Suitable stops may be provided for holding the table in proper position when rolled to a position 180° from that shown in Figs. 1 and 2.

The mechanism thus described may be duplicated upon the other side of the machine, if desirable or necessary.

It will be noted that in the construction heretofore explained the block 7 has a sliding mounting in the head 6, and further it will be noted that the cross members 19 are arranged so that the pinion 20 does not immediately engage with the same. This construction is for the purpose of permitting the jarring of the mold without engagement between the pinion and its rack. The construction is therefore so designed that the raising and lowering of the table 9 incident to the jarring action may be readily accomplished without causing engagement between the rack and its pinion. Furthermore, it is necessary that the table 9 be raised somewhat above the jarring table with which it is used before the roll over action be started, for the purpose of providing clearance that the roll over table and the jarring table may not interfere.

I have shown in Figs. 1 and 2 conventionally a platform, which is represented at 21. This platform may be of usual construction and operated to jar and to raise and lower for the purpose of drawing the pattern. No mechanism for operating the table is shown, as it forms no part of this invention.

By the construction which has heretofore been described, namely, the supporting platform 1, being movable with the mechanism carried thereby, it is possible to move the roll over table away from the jarring table after the jarring table has received the mold with the pattern drawn therefrom. This feature permits the easy handling of the mold without difficulty, which is not always the case when the roll over table remains above the jarring table. This feature is explained in a co-pending application, and will not be further explained in this application.

Having thus described my invention, I claim:—

1. In a molding machine, the combination with a roll over molding table, a rack member, and a pinion member associated with said roll over table, one of said members being stationary, and the other adapted to move with the table, whereby the table is rolled over as it is raised, and means for raising the said table.

2. In a molding machine, the combination with a roll over table, a fixed rack member, and a pinion member associated with the table, means for raising and lowering the table, whereby the pinion is caused to turn by its engagement with the rack and cause the table to roll over.

3. In a molding machine, the combination with a roll over table, trunnions upon which said table is carried, journals for said trunnions, means for raising and lowering the said journals, a rack member mounted stationarily with respect to the table, a pinion carried by one of the said trunnions and adapted to engage with the rack whereby the table will be rolled over as the same is raised.

4. In a molding machine, the combination with a roll over molding table, trunnions upon which the said table is mounted, means for raising and lowering the said trunnions, a pinion carried upon one of said trunnions, a rack with which the said pinion is adapted to coöperate, said rack being stationarily mounted with respect to the table and its pinion, the teeth upon the rack being so arranged that the table is raised a short distance before the pinion and teeth upon the rack become coöperative.

In testimony whereof, I hereunto affix my signature in the presence of two witnesses.

JOHN T. STONEY.

Witnesses:
 CAROLINE WILLIAMS,
 BURT P. WILLIAMS.

Copies of this patent may be obtained for five cents each, by addressing the "Commissioner of Patents, Washington, D. C."